(12) United States Patent
Critz et al.

(10) Patent No.: US 7,079,861 B2
(45) Date of Patent: Jul. 18, 2006

(54) METHOD AND SYSTEM FOR MONITORING STATUS IN A NETWORK HAVING WIRELESS AND WIRED CONNECTIONS

(75) Inventors: Christian L. Critz, Georgetown, TX (US); Nikolai V. Vyssotski, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 80 days.

(21) Appl. No.: 10/814,529

(22) Filed: Mar. 31, 2004

(65) Prior Publication Data

US 2004/0179505 A1  Sep. 16, 2004

Related U.S. Application Data

(63) Continuation of application No. 10/056,378, filed on Jan. 24, 2002.

(51) Int. Cl.
*H04Q 7/20* (2006.01)
(52) U.S. Cl. ............... 455/552.1; 455/551; 455/550.1
(58) Field of Classification Search ............ 455/403, 455/74, 74.1, 426.1, 462, 557, 566, 567, 455/550, 552.1, 551, 461; 370/338, 328, 370/345, 349; 345/179; 715/772, 846; 709/227, 709/230, 250; 340/825.36, 825.49
See application file for complete search history.

(56) References Cited

U.S. PATENT DOCUMENTS

| | | | |
|---|---|---|---|
| 4,415,921 A | 11/1983 | Mulvanny et al. | |
| 4,458,331 A | 7/1984 | Amezcua et al. | |
| 4,978,317 A | 12/1990 | Pocrass | |
| 5,103,402 A | 4/1992 | Morton et al. | |
| 5,155,600 A | 10/1992 | Maeda | |
| 5,289,394 A | 2/1994 | Lapeyre | |
| 5,378,052 A | 1/1995 | Yoshino | |
| 5,533,117 A | 7/1996 | Kim | |
| 5,613,873 A | 3/1997 | Bell, Jr. | |
| 5,654,726 A | 8/1997 | Mima et al. | |
| 5,778,398 A | 7/1998 | Nagashima et al. | |
| 5,815,158 A | 9/1998 | Lubachevsky et al. | |
| 5,874,931 A | 2/1999 | Drake et al. | |
| 5,896,532 A | 4/1999 | Blewett | |
| 5,983,117 A * | 11/1999 | Sandler et al. ............ | 455/557 |
| 6,025,846 A | 2/2000 | Chudley | |
| 6,031,510 A | 2/2000 | Drake et al. | |
| 6,084,553 A | 7/2000 | Walls et al. | |
| 6,088,005 A | 7/2000 | Walls et al. | |
| 6,295,197 B1 | 9/2001 | Watts, Jr. et al. | |
| 6,804,536 B1 * | 10/2004 | Bultman ................... | 455/557 |
| 2002/0072391 A1 * | 6/2002 | Itoh et al. ................. | 455/557 |

OTHER PUBLICATIONS

Printed material from www.macwindows.com/keytips.html, "Tips for Sharing Keyboards and Monitors", by Henry Norr dated Oct. 31, 2001.

* cited by examiner

*Primary Examiner*—Jean Gelin
(74) *Attorney, Agent, or Firm*—Haynes and Boone, LLP

(57) ABSTRACT

In an information handling system that includes a connector for receiving a removable wireless device, an indicator is shared between the wireless device and a fixed network controller. The indicator is for indicating multiple non-zero communication speeds of the wireless device, and for indicating multiple non-zero communication speeds of the network controller.

23 Claims, 3 Drawing Sheets

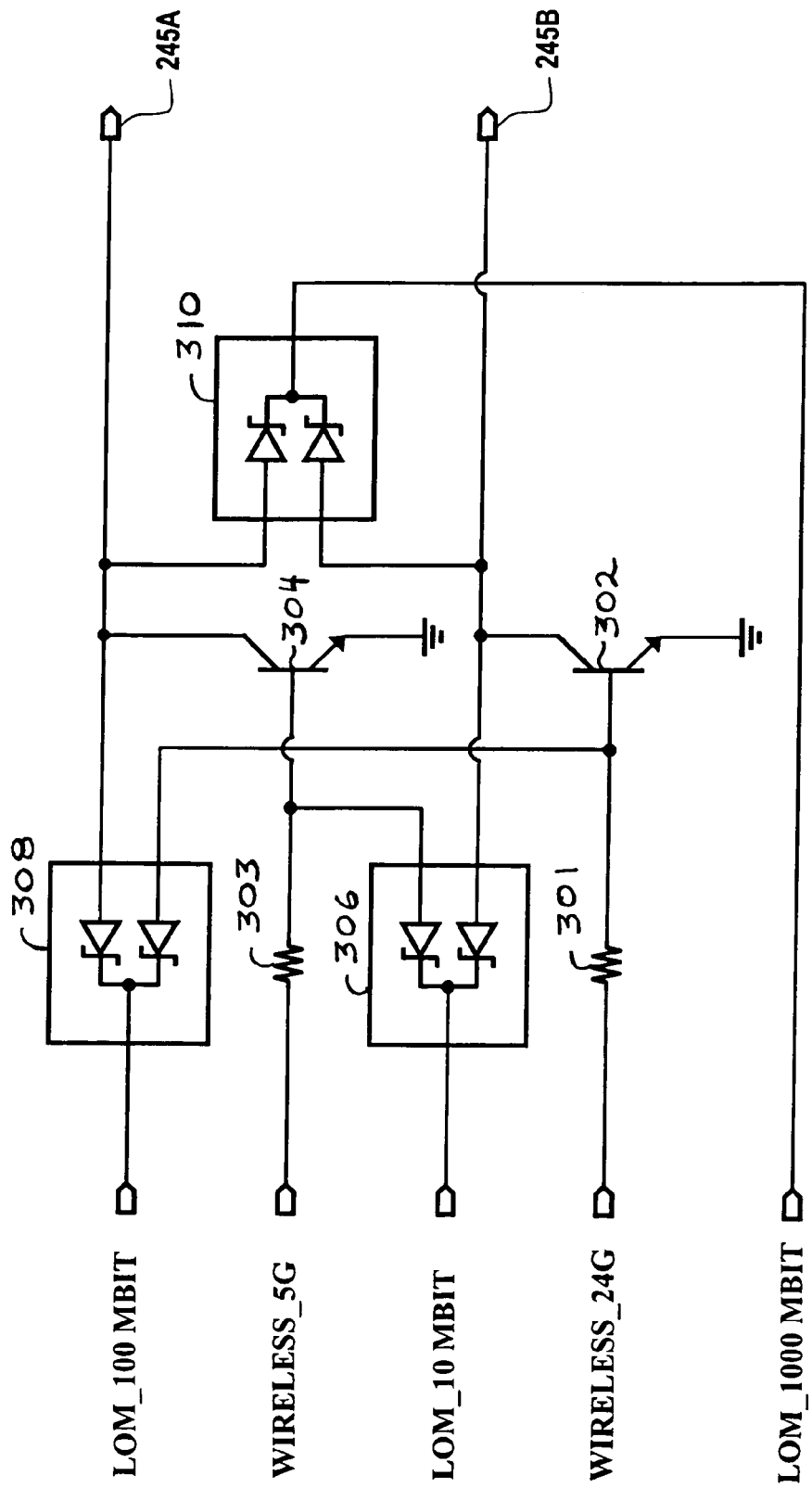

METHOD AND SYSTEM FOR MONITORING STATUS IN A NETWORK HAVING WIRELESS AND WIRED CONNECTIONS

CROSS REFERENCE TO RELATED APPLICATION

This application is a continuation-in-part of commonly assigned U.S. patent application Ser. No. 10/056,378, filed on Jan. 24, 2002, by Chen et al., entitled INFORMATION HANDLING SYSTEM WITH WIRELESS LAN AND WIRED LAN ACTIVITY MONITORING APPARATUS AND METHODOLOGY, which is hereby incorporated herein in its entirety by this reference thereto.

BACKGROUND

The disclosures herein relate in general to information handling systems and in particular to a method and system for monitoring status in a network having wireless and wired connections.

Information handling systems (e.g., portable computers) are frequently equipped with an integrated network controller, such as a local area network ("LAN") on motherboard ("LOM") network controller. With the LOM network controller, the information handling system readily connects (via a wired connection) to a wired network, so that a user is not compelled to install additional hardware. Also, wireless information handling systems are popular. To achieve wireless communication, information handling systems are frequently equipped with a radio frequency ("RF") modem, which typically plugs into a mating connector of the information handling system.

Many users prefer to monitor a status of their network connections, whether it be wired or wireless. According to one conventional technique for monitoring a status of the wired connection, the system has a network connector (e.g., jack) that includes 2 LED indicators, namely (a) a first LED to monitor activity of the wired connection and (b) a second LED to monitor speed of the wired connection. For example, with at least one version of an RJ-45 connector, a first LED glows yellow to indicate activity on the wired connection, and a second LED glows a suitable one of 2 different colors to indicate different network speeds. In this example, when the second LED is green, it indicates a 10 Mbps wired connection, and when the second LED is amber, it indicates a 100 Mbps wired connection.

According to one conventional technique for monitoring a status of the wireless connection (in addition to the wired connection), the system has additional indicators that are dedicated to monitoring the wireless connection's activity and speed. However, such a technique increases the system's overall cost, due to: (a) expenses associated with providing multiple versions of systems with different mechanical housings (e.g., a first mechanical housing having indicators for a system with a fixed network controller, and a second mechanical housing having additional indicators for a system with both the fixed network controller and a wireless modem); and (b) an overall increase in the system's parts count.

Accordingly, a need has arisen for a method and system for monitoring status in a network having wireless and wired connections, in which more status is indicated by a fixed number of indicators.

SUMMARY

Accordingly, in one embodiment of an information handling system that includes a connector for receiving a removable wireless device, an indicator is shared between the wireless device and a fixed network controller. The indicator is for indicating multiple non-zero communication speeds of the wireless device, and for indicating multiple non-zero communication speeds of the network controller.

It is a technical advantage of this embodiment that more status is indicated by a fixed number of indicators, which lowers the system's overall cost.

BRIEF DESCRIPTION OF THE DRAWING

FIG. 3 is a schematic electrical circuit diagram of discrete logic of FIG. 2.

DETAILED DESCRIPTION

Figure 1:
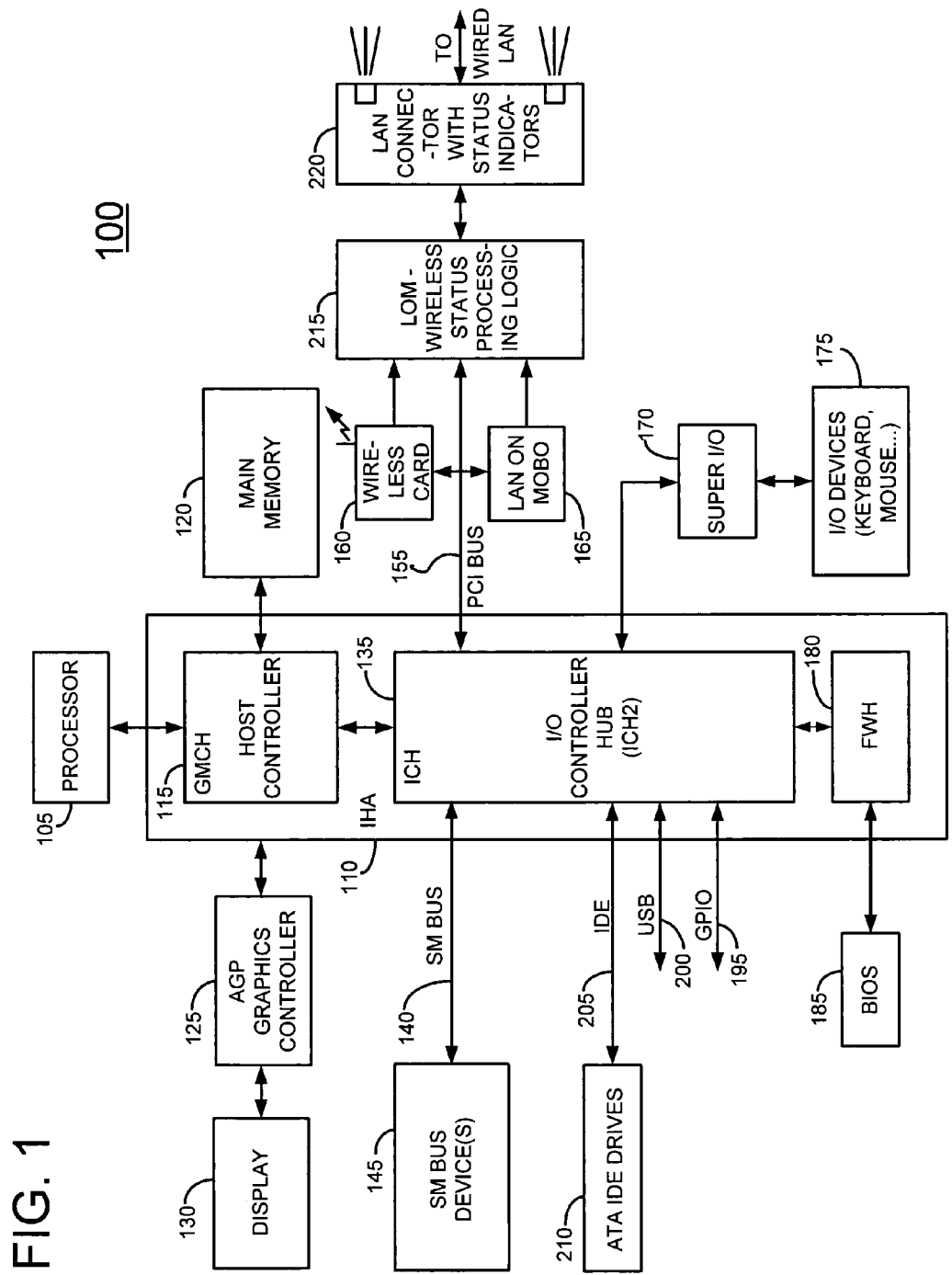
FIG. 1 is a block diagram of an information handling system, according to an illustrative embodiment.

FIG. 1 is a block diagram of an information handling system 100, according to the illustrative embodiment. An information handling system is, for example, an instrumentality or aggregate of instrumentalities primarily designed to compute, classify, process, transmit, receive, retrieve, originate, switch, store, display, manifest, detect, record, reproduce, handle, or utilize any form of information, intelligence or data for business, scientific, control or other purposes.

The particular information handling system 100 depicted in FIG. 1 is a portable computer system. However, the disclosed technology can be practiced on other systems as well, such as desktop, server, and both smaller and larger systems. Computer system 100 includes a processor 105, which is operable at different clocking rates, such as 1.0 GHz, 1.13 GHz or 1.2 GHz.

An Intel Hub Architecture ("IHA") chip 110 performs memory and I/O operations of system 100. More particularly, IHA chip 110 includes a graphics and AGP memory controller hub ("GMCH") 115, which operates: (a) as a host controller that communicates with processor 105; (b) as a controller for main memory 120; and (c) as an interface to advanced graphics port ("AGP") controller 125, which is coupled as a communication interface between GMCH 115 and a display 130. IHA chip 110 further includes an input/output ("I/O") controller hub ("ICH") 135, which is coupled to GMCH 115 and performs numerous I/O operations. For example, ICH 135 is coupled through a system management bus ("SM Bus") 140 to one or more SM Bus devices 145.

A super I/O controller 170 is coupled as a communication interface between ICH 135 and I/O devices 175, such as a keyboard and mouse. A firmware hub ("FWH") 180 is coupled as a communication interface between ICH 135 and system BIOS 185. Also, ICH 135 is coupled to a general purpose I/O ("GPIO") bus 195 and USB ports 200. USB devices (e.g., printers, scanners, joysticks) are connectable to the USB ports 200. Moreover, ICH 135 is coupled through an integrated drive electronics ("IDE") bus 205 to IDE drives 210.

Figure 2:
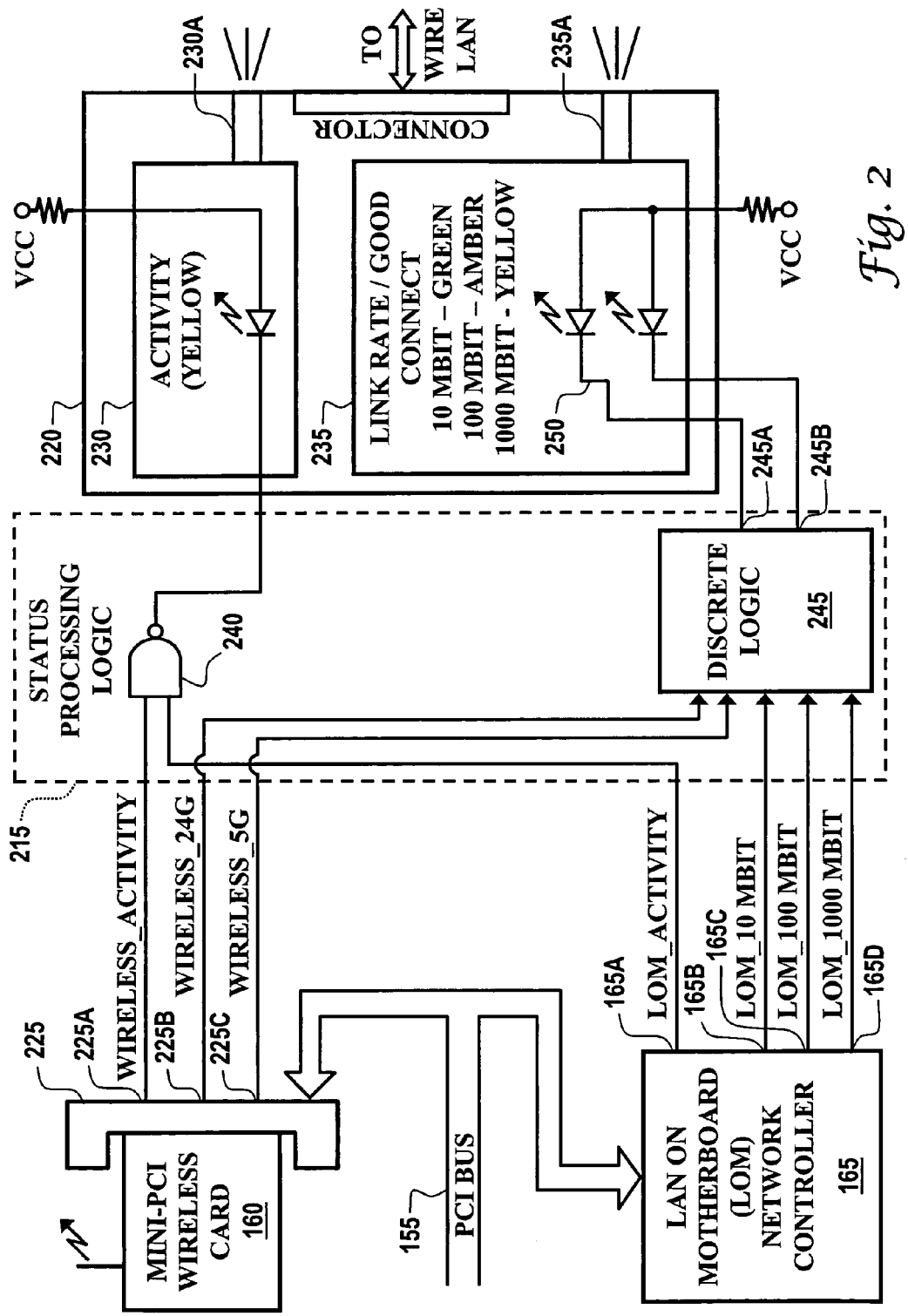
FIG. 2 is a block diagram of network status monitoring circuitry of the information handling system of FIG. 1.

ICH 135 is coupled through a peripheral component interconnect ("PCI") bus 155 to a mini-PCI connector 225 (FIG. 2). In the illustrative embodiment, a wireless device (e.g., RF modem mini-PCI wireless card) 160 is removably attachable to the mini-PCI connector 225, and thereby selectively coupled to PCI bus 155. For example, wireless device 160 is generally a plug-in card, which is physically accessed (e.g., inserted and removed) through an opening (which may be covered by a door or panel) in a mechanical housing of system 100. In other embodiments, wireless device 160 is not generally user accessible within the mechanical housing of system 100. When the wireless device 160 is coupled (e.g., via attachment to the mini-PCI connector 225) to PCI bus 155, the wireless device 160 connects the system 100 to a wireless network.

In the illustrative embodiment, a LOM controller 165 is fixably attached by soldering to a motherboard of system 100 (e.g., a motherboard on which various other components of system 100 are located), within the mechanical housing of system 100. Accordingly, LOM controller 165 is classified as being internally fixed within system 100.

Moreover, LOM controller 165 is coupled to PCI bus 155. Accordingly, when the LOM controller 165 is coupled (e.g., via a wired network cable) to a wired network, the LOM controller 165 connects the system 100 to the wired network.

Both wireless device 160 (if installed or "present" in system 100, such as by coupling to PCI bus 155) and LOM controller 165 are coupled to LOM-wireless status processing logic 215. Processing logic 215 is coupled to a wire LAN connector 220, which has status indicators. The operations of processing logic 215 and LAN connector 220 are discussed in more detail below in connection with FIG. 2.

FIG. 2 is a block diagram of network monitoring circuitry of system 100. The mini-PCI connector 225 is fixably attached to the motherboard of system 100. Wireless device 160 is attachable to mini-PCI connector 225 by being insertable (or "pluggable") into mini-PCI connector 225, as shown in FIG. 2.

When so inserted, the wireless device 160 is "present" or "installed" in system 100. According to the user's preference, system 100 either has or does not have wireless device 160 pre-installed within the mechanical housing of system 100. Wireless device 160 is selected from among a wide variety of RF modems, such as a card meeting IEEE spec. 802.11.

Status processing logic 215 processes information from both wireless device 160 and LOM controller 165, so that both the wireless device 160 and LOM controller 165 share the same status indicators in LAN connector 220. LAN connector 220 includes an activity indicator 230. In one embodiment, activity indicator 230 is a light emitting diode ("LED") that selectively glows yellow to indicate "activity," and such yellow light is visible to the user through a light pipe 230A opening in the mechanical housing of system 100.

Also, LAN connector 220 includes a "link rate" indicator 235, which is a tri-color indicator. In one embodiment, link rate indicator 235 includes multiple LEDs 250. For example, in FIG. 2, LEDs 250 include both a GREEN indicator (e.g., green LED) and an AMBER indicator (e.g., amber LED), which share a common lens, and their light is visible to the user through a light pipe 235A. If only the GREEN indicator is illuminated, the resulting color of link rate indicator 235 is green. If only the AMBER indicator is illuminated, the resulting color of link rate indicator 235 is amber. If both the GREEN indicator and AMBER indicator are illuminated, the resulting color of link rate indicator 235 is yellow.

When link rate indicator 235 is green, either wireless device 160 or LOM controller 165 is operating at a first non-zero link rate (e.g., either 2.4 GHz or 10 Mbps, respectively). By comparison, when link rate indicator 235 is amber, either wireless device 160 or LOM controller 165 is operating at a second non-zero link rate (e.g., either 5 GHz or 100 Mbps, respectively). Or, when link rate indicator 235 is yellow, either wireless device 160 or LOM controller 165 is operating at a third non-zero link rate (e.g., either higher than 5 GHz, or 1000 Mbps, respectively). For example, a first version of wireless device 160 operates at a link rate (or "transmission rate," "transmission speed," "communication rate" or "communication speed") of 2.4 GHz. A second version of wireless device 160 operates at a link rate of 5 GHz. A third version of wireless device 160 operates at even higher link rates. Various connectors are suitable for use as LAN connector 220, such as an RJ-45 connector.

To enable sharing of status indicators 230 and 235 by both wireless device 160 and LOM controller 165, status processing logic 215 selectively outputs signals to LAN connector 220, in response to signals from wireless device 160 and LOM controller 165. Wireless connector 225 includes a WIRELESS_ACTIVITY output 225A for selectively outputting a WIRELESS_ACTIVITY signal. The WIRELESS_ACTIVITY signal is "active low," so that its "low" logic state (i.e., binary 0 value) indicates wireless activity by the wireless device 160. Conversely, if the WIRELESS_ACTIVITY signal has a "high" logic state (i.e., binary 1 value), wireless activity is absent. Accordingly, if the wireless device 160 is absent (e.g., removed or not inserted), system 100 pulls the WIRELESS_ACTIVITY signal to a high logic state.

Similarly, LOM controller 165 includes a LOM_ACTIVITY output 165A for selectively outputting a LOM_ACTIVITY signal. The LOM_ACTIVITY signal is also "active low," so that its low logic state indicates LOM activity. Conversely, if the LOM_ACTIVITY signal is high (i.e., has a high logic state), LOM activity is absent.

In status processing logic 215, a NAND gate 240 receives the WIRELESS_ACTIVITY signal and the LOM_ACTIVITY signal and, in response thereto, selectively outputs a signal to activity indicator 230. Accordingly, if either the WIRELESS_ACTIVITY signal or the LOM_ACTIVITY signal is low (i.e., has a low logic state), then activity indicator 230 glows (or "is on" or "is illuminated"), thereby notifying the user that activity is present (or "is occurring"). The NAND gate 240 behaves according to the following truth table (TRUTH TABLE 1).

TRUTH TABLE 1

| WIRELESS_ACTIVITY | LOM_ACTIVITY | ACTIVITY INDICATOR 230 ON (YELLOW) |
|---|---|---|
| 0 | 0 | 1 |
| 0 | 1 | 1 |
| 1 | 0 | 1 |
| 1 | 1 | 0 |

Wireless connector 225 includes: (a) a WIRELESS_24G output 225B for selectively outputting a WIRELESS_24G signal; and (b) a WIRELESS_5G output 225C for selectively outputting a WIRELESS_5G signal. The WIRELESS_24G signal indicates whether the wireless device 160 (if installed and switched on) is operating at a link rate of 2.4 GHz. The WIRELESS_5G signal indicates whether the wireless device 160 (if installed and switched on) is operating at a link rate of 5 GHz.

The WIRELESS_24G signal is "active high," so that its high logic state indicates that the wireless device 160 is operating at a link rate of 2.4 GHz. Likewise, the WIRELESS_5G signal is active high, so that its high logic state indicates that the wireless device 160 is operating at a link rate of 5 GHz. In the illustrative embodiment, if both the WIRELESS_24G and WIRELESS_5G signals are high, the wireless device 160 is operating at a link rate higher than 5 GHz. If the wireless device 160 is absent, system 100 pulls the WIRELESS_24G and WIRELESS_5G signals to a low logic state. Accordingly, if the WIRELESS_24G and WIRELESS_5G signals are both low, then wireless device 160 is either absent or switched off. In status processing logic 215, discrete status processing logic ("discrete logic") 245 receives the WIRELESS_24G and WIRELESS_5G signals and, in response thereto, selectively outputs signals (through outputs 245A and 245B) to link rate indicator 235.

LOM controller 165 includes: (a) a LOM_10 MBIT output 165B for selectively outputting a LOM_10 MBIT signal; (b) a LOM_100 MBIT output 165C for selectively outputting a LOM_100 MBIT signal; and (c) a LOM_1000 MBIT output 165D for selectively outputting a LOM_1000 MBIT signal. The LOM_10 MBIT, LOM_100 MBIT and LOM_1000 MBIT signals are active low. Accordingly, if the LOM_10 MBIT signal is low, LOM controller 165 is operating at 10 Mbps. Or, if the LOM_100 MBIT signal is low, LOM controller 165 is operating at 100 Mbps. Or, if the LOM_1000 MBIT signal is low, LOM controller 165 is operating at 1000 Mbps. In status processing logic 215, discrete logic 245 receives the LOM_10 MBIT, LOM_100 MBIT and LOM_1000 MBIT signals and, in response thereto, selectively outputs signals (through outputs 245A and 245B) to link rate indicator 235.

Output 245A is connected to the AMBER indicator of LEDs 250. Output 245B is connected to the GREEN indicator of LEDs 250. The signals through outputs 245A and 245B are active low, and discrete logic 245 operates them according to the following truth table (TRUTH TABLE 2) to turn on either: (a) the GREEN indicator of LEDs 250, if only the signal of output 245B is low, so that link rate indicator 235 glows green (thereby indicating either that wireless device 160 is operating at a link rate of 2.4 GHz or that LOM controller 165 is operating at a link rate of 10 Mbps); or (b) the AMBER indicator of LEDs 250, if only the signal of output 245A is low, so that link rate indicator 235 glows amber (thereby indicating either that wireless device 160 is operating at a link rate of 5 GHz or that LOM controller 165 is operating at a link rate of 100 Mbps); or (c) both the GREEN and AMBER indicators of LEDs 250, if both the signals of outputs 245A and 245B are low, so that link rate indicator 235 glows yellow (thereby indicating either that wireless device 160 is operating at a link rate higher than 5 GHz or that LOM controller 165 is operating at a link rate of 1000 Mbps).

TRUTH TABLE 2

|   | WIRELESS_24G | WIRELESS_5G | LOM_10 MBIT | LOM_100 MBIT | LOM_1000 MBIT | GREEN | AMBER |
|---|---|---|---|---|---|---|---|
|   | 0 | 0 | 1 | 1 | 1 | OFF | OFF |
|   | 1 | 0 | 1 | 1 | 1 | ON | OFF |
|   | 0 | 1 | 1 | 1 | 1 | OFF | ON |
|   | 1 | 1 | 1 | 1 | 1 | ON | ON |
| * | X | X | 0 | 1 | 1 | ON | OFF |
| * | X | X | 1 | 0 | 1 | OFF | ON |
| * | X | X | 1 | 1 | 0 | ON | ON |
| ** | X | X | 0 | 0 | 1 | X | X |
| ** | X | X | 0 | 1 | 0 | X | X |
| ** | X | X | 1 | 0 | 0 | X | X |
| ** | X | X | 0 | 0 | 0 | X | X |

*in this state, WIRELESS_24G and WIRELESS_5G have no affect on outputs 245A and 245B, because indication of LOM controller's link rate has priority over indication of wireless device's link rate
**NOT a permitted state for LOM controller FIG. 3 is a schematic electrical circuit diagram of discrete logic 245. As shown in FIG. 3, WIRELESS_24G is coupled through a resistor 301 to the base of an NPN bipolar transistor 302. WIRELESS_5G is coupled through a resistor 303 to the base of an NPN bipolar transistor 304. LOM_10 MBIT is connected to an output of a zener diode pair 306. LOM_100 MBIT is connected to an output of a zener diode pair 308. LOM_1000 MBIT is connected to an output of a zener diode pair 310.

A collector of transistor 302 is connected to output 245B, and an emitter of transistor 302 is connected to a voltage reference node (e.g., having 0 voltage). A collector of transistor 304 is connected to output 245A, and an emitter of transistor 304 is connected to the voltage reference node.

A first input of diode pair 308 is connected to the base of transistor 302, and a second input of diode pair 308 is connected to output 245A. A first input of diode pair 306 is connected to the base of transistor 304, and a second input of diode pair 306 is connected to output 245B. A first input of diode pair 310 is connected to output 245A, and a second input of diode pair 310 is connected to output 245B.

Accordingly, if the LOM_10 MBIT signal is low, then: (a) the logic state of output 245B is pulled low, so that current flows through the GREEN indicator of LEDs 250, and the link rate indicator 250 glows green, thereby indicating that LOM controller 165 is operating at a link rate of 10 Mbps; and (b) the logic state of the base of transistor 304 is pulled low, so that WIRELESS_5G does not affect the logic states of outputs 245A and 245B, and so that current does not flow through the AMBER indicator of LEDs 250. In this situation: (a) a low logic state of the WIRELESS_24G signal does not turn on transistor 302 and, accordingly, does not affect the logic states of outputs 245A and 245B; and (b) a high logic state of the WIRELESS_24G signal turns on transistor 302, which pulls the logic state of output 245B low, consistent with the affect of the low LOM_10 MBIT signal. In that manner, discrete logic 245 overrides the wireless device 160 sharing of LEDs 250 when the LOM controller 165 is connected to a wire LAN, so that access to the LEDs is provided to the LOM controller 165 instead of the wireless device 160.

If the LOM_100 MBIT signal is low, then: (a) the logic state of output 245A is pulled low, so that current flows through the AMBER indicator of LEDs 250, and the link rate indicator 250 glows amber, thereby indicating that LOM controller 165 is operating at a link rate of 100 Mbps; and (b) the logic state of the base of transistor 302 is pulled low, so that WIRELESS_24G does not affect the logic states of outputs 245A and 245B, and so that current does not flow through the GREEN indicator of LEDs 250. In this situation: (a) a low logic state of the WIRELESS_5G signal does not turn on transistor 304 and, accordingly, does not affect the logic states of outputs 245A and 245B; and (b) a high logic state of the WIRELESS_5G signal turns on transistor 304, which pulls the logic state of output 245A low, consistent with the affect of the low LOM_10 MBIT signal. In that manner, discrete logic 245 overrides the wireless device 160 sharing of LEDs 250 when the LOM controller 165 is connected to a wire LAN, so that access to the LEDs is provided to the LOM controller 165 instead of the wireless device 160.

If the LOM_1000 MBIT signal is low, then: (a) the logic state of output 245A is pulled low, so that current flows through the AMBER indicator of LEDs 250; (b) the logic state of output 245B is pulled low, so that current flows through the GREEN indicator of LEDs 250; and (c) accordingly, the link rate indicator 250 glows yellow, thereby indicating that LOM controller 165 is operating at a link rate of 1000 Mbps. In this situation: (a) a low logic state of the WIRELESS_24G signal does not turn on transistor 302 and, accordingly, does not affect the logic states of outputs 245A and 245B; and (b) a low logic state of the WIRELESS_5G signal does not turn on transistor 304 and, accordingly, does not affect the logic states of outputs 245A and 245B. Also, in this situation: (a) a high logic state of the WIRELESS_24G signal turns on transistor 302, which pulls the logic state of output 245B low, consistent with the affect of the low LOM_1000 MBIT signal; and (b) a high logic state of the WIRELESS_5G signal turns on transistor 304, which pulls the logic state of output 245A low, consistent with the affect of the low LOM_1000 MBIT signal. In that manner, discrete logic 245 overrides the wireless device 160 sharing of LEDs 250 when the LOM controller 165 is connected to a wire LAN.

If the LOM_10 MBIT, LOM_100 MBIT and LOM_1000 MBIT signals are high: (a) a low logic state of the WIRELESS_24G signal does not turn on transistor 302, so that current does not flow through the GREEN indicator of LEDs 250; (b) a low logic state of the WIRELESS_5G signal does not turn on transistor 304, so that current does not flow through the AMBER indicator of LEDs 250; (c) a high logic state of the WIRELESS_24G signal turns on transistor 302, which pulls the logic state of output 245B low, so that current flows through the GREEN indicator of LEDs 250; and (d) a high logic state of the WIRELESS_5G signal turns on transistor 304, which pulls the logic state of output 245A low, so that current flows through the AMBER indicator of LEDs 250. In this situation: (a) if current flows through only the GREEN indicator of LEDs 250, the link rate indicator 250 glows green, thereby indicating that the wireless device 160 is operating at a link rate of 2.4 GHz; (b) if current flows through only the AMBER indicator of LEDs 250, the link rate indicator 250 glows amber, thereby indicating that the wireless device 160 is operating at a link rate of 5 GHz; and (c) if current flows through both the GREEN and AMBER indicators of LEDs 250, the link rate indicator 250 glows yellow, thereby indicating that the wireless device 160 is operating at a link rate higher than 5 GHz.

In an example operation, if system 100 is operating in wireless mode (e.g., if wireless device 160 is installed and switched on), and if system 100 is not connected through LOM controller 165 to a wired network (e.g., via a wired network cable), then: (a) the LOM_10 MBIT, LOM_100 MBIT and LOM_1000 MBIT signals are high; and (b) the WIRELESS_24G signal and/or WIRELESS_5G signal is/are high. In this situation, the LEDs 250 selectively glow either green, amber or yellow, according to whether the WIRELESS_24G signal and/or WIRELESS_5G signal is/are high, thereby indicating the link rate (and likewise indicating a working connection to the wireless network) to the user as discussed above. Also, in this situation, the activity indicator 230 selectively glows yellow, according to whether the WIRELESS_ACTIVITY signal is low, thereby indicating periods of activity to the user as discussed above.

In another example operation, if system 100 is not operating in wireless mode (e.g., if wireless device 160 is either switched off or not installed), and if system 100 is connected through LOM controller 165 to a network by a wired (or "wire" or "hard-wired") network cable, then: (a) the WIRELESS_24G and WIRELESS_5G signals are low; and (b) one of the LOM_10 MBIT, LOM_100 MBIT and LOM_1000 MBIT signals is low. In this situation, the LEDs 250 selectively glow either green, amber or yellow, according to whether the LOM_10 MBIT signal, LOM_100 MBIT signal or LOM_1000 MBIT signal is low, thereby indicating the link rate (and likewise indicating a working connection to the wired network) to the user as discussed above. Also, in this situation, the activity indicator 230 selectively glows yellow, according to whether the LOM_ACTIVITY signal is low, thereby indicating periods of activity to the user as discussed above.

A principal advantage of these embodiments is the provision of technology for an information handling system to indicate status (e.g., activity and link rate) of LOM controllers and wireless devices, using a fixed number of indicators (e.g., a fixed number of LEDs) that is the same number as otherwise used for indicating status of the LOM controller alone. This technology has been described with reference to an information handling system such as a portable computer, but the disclosed technology likewise applies to other types of information handling systems (e.g., computer systems) that are processor dependent, including electrical devices such as personal digital assistants ("PDAs"), cellular and other telephone devices, satellite receivers, home entertainment systems, electronic gaming equipment, configurable automotive electronic devices, similar devices, and combinations thereof.

Although illustrative embodiments have been shown and described, a wide range of modification, change and substitution is contemplated in the foregoing disclosure and, in some instances, some features of the embodiments may be employed without a corresponding use of other features.

What is claimed is:

1. An information handling system, comprising:
   a processor for coupling to a memory;
   a connector for receiving a removable wireless device, the connector selectively outputting a first wireless signal to a discreet logic device and a second wireless signal to the discreet logic device;
   a fixed network controller; and
   an indicator coupled to the discreet logic device and shared between the wireless device and the network controller, for indicating multiple non-zero communication speeds of the wireless device, for indicating multiple non-zero communication speeds of the network controller, and for receiving selected outputs from the discreet logic device.

2. The system of claim 1, wherein at least one communication speed of the network controller is different from the communication speeds of the wireless device.

3. The system of claim 1, wherein at least one communication speed of the wireless device is different from the communication speeds of the network controller.

4. The system of claim 1, wherein the communication speeds of the wireless device include at least three communication speeds.

5. The system of claim 1, wherein the communication speeds of the network controller include at least three communication speeds.

6. The system of claim 1, wherein the indicator is a first indicator, and comprising:
a second indicator, shared between the wireless device and network controller, for indicating network activity.

7. The system of claim 1, wherein the indicator is for indicating a working wireless network connection and for indicating a working wired network connection.

8. The system of claim 1, wherein the indicator includes at least first and second indicators for indicating the communication speeds.

9. The system of claim 1, and comprising:
status processing logic for overriding the wireless device sharing of the indicator when the network controller is connected to a wired network, so that access to the indicator is provided to the network controller instead of the wireless device.

10. The system of claim 1, wherein the indicator is integrated in a wired connector.

11. The system of claim 1, wherein the network controller is fixably attached to a motherboard.

12. The system of claim 1, wherein the connector is fixably attached to a motherboard, and wherein the wireless device is removably attachable to the connector.

13. The system of claim 1, wherein the connector is a mini-PCI connector.

14. The system of claim 1, wherein the wireless device is a mini-PCI wireless card.

15. A method of operating an information handling system that includes a processor for coupling to a memory, a connector for receiving a removable wireless device, and a fixed network controller, the method comprising:
the connector selectively outputting a first wireless signal to a discreet logic device and a second wireless signal to the discreet logic device; and between the wireless device and the network controller, sharing an indicator coupled to the discreet logic device for indicating multiple non-zero communication speeds of the wireless device, for indicating multiple non-zero communication speeds of the network controller, and for receiving selected outputs from the discreet logic device.

16. The method of claim 15, wherein at least one communication speed of the network controller is different from the communication speeds of the wireless device.

17. The method of claim 15, wherein at least one communication speed of the wireless device is different from the communication speeds of the network controller.

18. The method of claim 15, wherein the communication speeds of the wireless device include at least three communication speeds.

19. The method of claim 15, wherein the communication speeds of the network controller include at least three communication speeds.

20. The method of claim 15, wherein the indicator is a first indicator, and comprising:
between the wireless device and network controller, sharing a second indicator for indicating network activity.

21. The method of claim 15, wherein sharing the indicator comprises:
sharing the indicator for indicating a working wireless network connection and for indicating a working wired network connection.

22. The method of claim 15, wherein sharing the indicator comprises:
sharing at least first and second indicators for indicating the communication speeds.

23. The method of claim 15, and comprising:
overriding the wireless device sharing of the indicator when the network controller is connected to a wired network, so that access to the indicator is provided to the network controller instead of the wireless device.

* * * * *

UNITED STATES PATENT AND TRADEMARK OFFICE
CERTIFICATE OF CORRECTION

| | | |
|---|---|---|
| PATENT NO. | : 7,079,861 B2 | Page 1 of 1 |
| APPLICATION NO. | : 10/814529 | |
| DATED | : July 18, 2006 | |
| INVENTOR(S) | : Christian L. Critz and Nikolai V. Vyssotski | |

It is certified that error appears in the above-identified patent and that said Letters Patent is hereby corrected as shown below:

On title page (item 63)

Under "Related U.S. Application Data"

Please change "Continuation" to --Continuation-in-Part--

Signed and Sealed this

Twenty-first Day of November, 2006

JON W. DUDAS
*Director of the United States Patent and Trademark Office*